(12) United States Patent
Kumazawa et al.

(10) Patent No.: US 9,820,500 B2
(45) Date of Patent: Nov. 21, 2017

(54) AMINO ACID CONTAINING GLYCOSYLATION COMPOSITION DERIVED FROM RICE, AND A METHOD OF PRODUCING THE SAME

(71) Applicant: TAKAI FOODS LTD., Mitsuke, Niigata (JP)

(72) Inventors: Masazumi Kumazawa, Mitsuke (JP); Yoichiro Takai, Mitsuke (JP)

(73) Assignee: TAKAI FOODS LTD, Niigata (JP)

( * ) Notice: Subject to any disclaimer, the term of this patent is extended or adjusted under 35 U.S.C. 154(b) by 27 days.

(21) Appl. No.: 14/894,247

(22) PCT Filed: Jul. 7, 2014

(86) PCT No.: PCT/JP2014/068050
§ 371 (c)(1),
(2) Date: Nov. 25, 2015

(87) PCT Pub. No.: WO2015/005281
PCT Pub. Date: Jan. 15, 2015

(65) Prior Publication Data
US 2016/0106129 A1  Apr. 21, 2016

(30) Foreign Application Priority Data

Jul. 10, 2013 (JP) ................... 2013-144946

(51) Int. Cl.

| | | |
|---|---|---|
| *A23F 3/16* | (2006.01) | |
| *A23L 1/23* | (2006.01) | |
| *A23L 7/104* | (2016.01) | |
| *A23L 27/21* | (2016.01) | |
| *A23L 27/24* | (2016.01) | |
| *A23L 27/50* | (2016.01) | |

(52) U.S. Cl.
CPC ............... *A23L 1/23* (2013.01); *A23L 7/107* (2016.08); *A23L 27/21* (2016.08); *A23L 27/24* (2016.08); *A23L 27/50* (2016.08); *A23V 2002/00* (2013.01)

(58) Field of Classification Search
CPC ........... A23L 1/23; A23L 1/1055; A23L 1/227
USPC ............................................. 426/28, 18, 622
See application file for complete search history.

(56) References Cited

U.S. PATENT DOCUMENTS 4,282,319 A * 8/1981 Conrad .................. A21D 13/02
426/18
2010/0009032 A1  1/2010 Kageyama et al.

FOREIGN PATENT DOCUMENTS

| JP | 2003-250485 A | 9/2003 |
| JP | 2009-225709 A | 10/2009 |
| WO | WO 2004/008836 A2 | 1/2004 |
| WO | WO 2007/072747 A1 | 6/2007 |

OTHER PUBLICATIONS

Hagenimana et al., "Evaluation of rice flour modified by extrusion cooking," Journal of Cereal Science, vol. 43, 2006, pp. 38-46.
Hayakawa et al., "Studies on the Production of Hydrolyzable Starchy Material in High Concentrated Substrate by Two-Stage Extrusion Cooking Method," Nippon Shokuhin Kogyo Gakkaishi, vol. 38, No. 10, 1991, pp. 945-953.
Li et al., "Design and optimization of an efficient enzymatic extrusion pretreatment for Chinese rice wine fermentation," Food Control, vol. 32, 2013, pp. 563-568.
Tomás et al., "Influence of Operating Conditions on the Extent of Enzymatic Conversion of Rice Starch in Wet Extrusion," Lebensmittel-Wissenschaft & Technologie, vol. 30, No. 1, 1997, pp. 50-55.
Akdogan, "High moisture food extrusion," International Journal of Food Science and Technology, vol. 34, No. 3, Jun. 30, 1999, pp. 195-207.
Kamara et al., "Variation in free amino acid profile among some rice (*Oryza sativa* L.) cultivars," Breeding Science, vol. 60 No. 1, Mar. 17, 2010, pp. 46-54 (10 pages total).
Singaporean Office Action and Search Report, dated Oct. 12, 2016, for Singaporean Application No. 11201510272R.
Steel et al., "Chapter 13: Thermoplastic Extrusion in Food Processing," Thermoplastic Elastomers, Mar. 28, 2012, pp. 265-290 (27 pages total).
Tomás et al., "Rheological Modelling of Enzymatic Extrusion of Rice Starch," Journal of Food Engineering, vol. 32, No. 2, May 31, 1997, 11 pages.

* cited by examiner

*Primary Examiner* — Hamid R Badr
(74) *Attorney, Agent, or Firm* — Birch, Stewart, Kolasch & Birch, LLP

(57) ABSTRACT

The purpose of the present invention is to continuously and inexpensively provide an amino acid containing glycosylation composition from rice. The method for producing an amino acid containing glycosylation composition derived from rice according to the present invention is characterized by comprising:
  a step for compressing and kneading rice powder or rice grains within a cylinder by using an extruder to break an α-1,4 bond in starch, and,
  a step for breaking the α-1,4 bond in starch and/or an α-1,6 bond in starch by adding an enzyme into the cylinder. Furthermore, in a preferable embodiment of the method for producing an amino acid containing glycosylation composition derived from rice according to the present invention, a step for adding water to the rice powder (or rice grains) is further carried out as preparation.

5 Claims, 1 Drawing Sheet

[Figure 1]
[Figure 2]
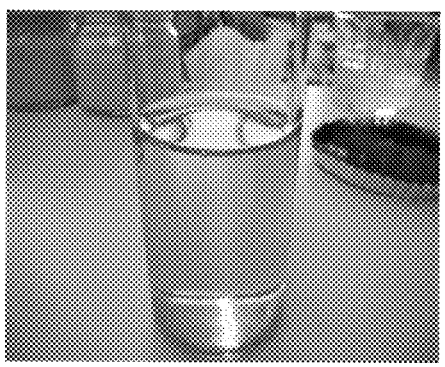
[Figure 3]
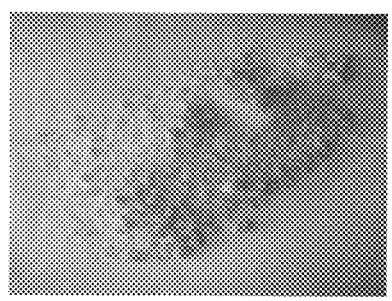

AMINO ACID CONTAINING GLYCOSYLATION COMPOSITION DERIVED FROM RICE, AND A METHOD OF PRODUCING THE SAME

TECHNICAL FIELD

The present invention relates to a composition containing a starch sugar and an amino acid made by using rice as a raw material and a method of producing the same.

BACKGROUND ART

In general, a method of using an acid, a method of using enzymes such as α-amylase, β-amylase and glucoamylase are made available as a method of producing the starch sugar such as dextrin, maltose, glucose.

However, these methods have been problems that a manufacturing facility become a very large scale, and thereby occurring a problem of an installation location, and requiring a large amount of water, steam and electricity, and a manufacturing cost become very high. Further, these starch sugar were made by using a starch of a raw material wherein the protein was preliminarily removed, and were produced under the conditions that it does not contain an amino acid which has significance and includes highly nutritious components.

On the other hand, except for these methods of production, for example, "a method of producing rice glycosylation liquid" of Mar. 11, 2005, is known wherein the method can accelerate a hydrolysis under high pressure (Patent Literature 1).

PRIOR ART LITERATURE

Patent Literatures

Patent literature 1: JP-A-2003-250485

DISCLOSURE OF THE INVENTION

Problems to be Resolved by the Invention

However, the method of glycosylation using the method has problems that a large amount of water must be still used, and it is not suited for continuous production, and still has a problem of an installation location. Moreover, in the prior art, 24 hours to 48 hours were required to obtain a glycosylation composition from a starch etc., and were required for a multiple batch process.

Therefore, it is an object of the present invention to continuously and inexpensively provide an amino acid containing glycosylation composition from rice.

Means of Solving the Problems

In order to attain the above object, the present inventors made strenuous studies regarding an extruder, as a result, the inventors discovered the present invention.

That is, a method of producing an amino acid containing glycosylation composition derived from rice is characterized by comprising:

a step of compressing and kneading rice powder or rice grains within a cylinder by using an extruder to break an α-1,4 bond in starch, and, a step of breaking the α-1,4 bond (it include a α-1,4 bond which can not be broke at the previous step etc.) in starch and/or a α-1,6 bond in starch by adding an enzyme into the cylinder.

Furthermore, in a preferred embodiment of a method of producing an amino acid containing glycosylation composition derived from rice according to the present invention, it is characterized by further comprising:

a step of adding water to the rice powder or (rice grains) as preparation.

Furthermore, in a preferred embodiment of a method of producing an amino acid containing glycosylation composition derived from rice according to the present invention, it is characterized in that the enzyme is a diastatic enzyme or a proteolytic enzyme.

Furthermore, in a preferred embodiment of a method of producing an amino acid containing glycosylation composition derived from rice according to the present invention, it is characterized in that the diastatic enzyme is at least one selected from β-amylase, glucoamylase, or a transglucosidase.

Furthermore, in a preferred embodiment of a method of producing an amino acid containing glycosylation composition derived from rice according to the present invention, it is characterized in that the proteolytic enzyme is a protease.

Furthermore, in a preferred embodiment of a method of producing an amino acid containing glycosylation composition derived from rice according to the present invention, it is characterized in that the extruder is a tandem type of extruder.

Furthermore, in a preferred embodiment of a method of producing an amino acid containing glycosylation composition derived from rice according to the present invention, it is characterized in that the tandem type of extruder is a three-stage comprising an upper cylinder, a middle cylinder and a lower cylinder, and a temperature of the cylinder drops down according to from the upper cylinder to the lower cylinder.

Furthermore, an amino acid containing glycosylation composition derived from rice according to the present invention is characterized in that it is obtained by the method of producing an amino acid containing glycosylation composition derived from rice according to the present invention.

Furthermore, in a preferred embodiment of an amino acid containing glycosylation composition derived from rice comprising a sugar made by a monosaccharide, a disaccharide, a trisaccharide and tetrasaccharide or more, and an amino acid, it is characterized in that a total amount of a monosaccharide or a disaccharide of the amino acid containing glycosylation composition is more than a total amount of a trisaccharide or tetrasaccharide or more.

Effect of Invention

The method of producing an amino acid containing glycosylation composition derived from rice according to the present invention has advantage effects that it is possible to contribute to shortening a time of manufacturing a fermented seasoning such as a fermented soybean paste, a soy sauce and a sweet cooking rice wine which require a huge amounts of time for manufacturing it in the prior art, or to reducing a manufacturing cost by using the composition obtained by the present method as a raw material. Furthermore, the method of producing an amino acid containing glycosylation composition derived from rice according to the present invention has advantage effects that it is possible to use it as an inexpensive sweetener which does not contain an amino acid in that case that a purified starch is used as a raw material.

Furthermore, the method of producing an amino acid containing glycosylation composition derived from rice according to the present invention has advantage effects that it is possible to provide a composition containing glucose, maltose and an amino acid by using a rice and an enzyme as a raw material according to need. The present invention, for example, has advantage effects that it is possible to obtain glucose by using glucoamylase as an enzyme, it is possible to obtain maltose by using β-amylase.

BRIEF DESCRIPTION OF THE DRAWINGS

FIG. 1 shows a liquid concentrated composition of an example embodiment of an amino acid containing glycosylation composition derived from rice according to the present invention. The composition contains an amino acid.

FIG. 2 shows a liquid purified preparation of an example embodiment of an amino acid containing glycosylation composition derived from rice according to the present invention. The main component is glucose.

FIG. 3 shows a powderized liquid concentrated composition (which is those shown in FIG. 1) of an example embodiment of an amino acid containing glycosylation composition derived from rice according to the present invention.

MODE FOR CARRYING OUT THE INVENTION

The method of producing an amino acid containing glycosylation composition derived from rice is characterized by comprising:
- a step of compressing and kneading rice powder or rice grains within a cylinder by using an extruder to break an α-1,4 bond in starch, and,
- a step of breaking the α-1,4 bond (it include a α-1,4 bond which can not be broken at the previous step etc.) in starch and/or an α-1,6 bond in starch by adding an enzyme into the cylinder. A rice powder or rice grains used for the present invention is not particularly limited. For example, as a rice powder or rice grains, it is possible to use a rice powder or rice grains obtained by using a nonglutinous rice, a glutinous rice etc., as a raw material. As rice grains, mention may be made of a clean rice, a brown rice, a crushed rice and an old rice etc.

Further, in general, a rice powder means those of polishing a raw rice of a nonglutinous rice, a glutinous rice and thereby breaking and powderizing it without distinction of a nonglutinous rice and a glutinous rice. Although as a raw rice before breaking, mention may be made of a clean rice, a brown rice, a crushed rice and an old rice etc., it is not particularly limited, it can be used as a rice powder for the composition according to the present invention.

As a method of flour milling of the rice powder, any methods such as a stamp mill, a roll mill, a stone mill, air flow mill, and a pin mill can be used.

Furthermore, in a preferred embodiment of the present invention, since it is also possible to convert rice grains into sugar, regarding the grain size of the rice powder, an upper limit of the grain diameter is not particularly limited. For example, it is possible to use from 3.5 mesh to 635 mesh which is a general standard of the mesh. Moreover, 3.5 mesh become about 5.6 mm, 635 mesh become about 20 μm.

Moreover, a method of measuring an average grain size depends on a method of measuring about particle diameter according to the "mesh pass" which is carried out as a general rule in the rice powder business field. Specifically, it is possible to use a sieve type of mesh and to rub with a brush to decide how many macro meter depending on the size of mesh which the particle passes. Therefore, more properly, an average particle size can be 30 to 80 μm if the minimum mesh pass is 150 and maximum mesh pass is 330.

Furthermore, in a preferred embodiment of a method of producing an amino acid containing glycosylation composition derived from rice according to the present invention, it is characterized by further comprising:
- a step of adding water to the rice powder or (rice grains) as preparation. Although it is possible to use both rice grains and rice powder used as a rice in the present invention, from a viewpoint of ensuring flexibility within a cylinder, 20 to 70% of the addition of water to these raw materials is preferable as preparation. In order to carry out a dispersion of moisture effectively, the use of about 30 to 350 μm of the rice powder is particularly preferable.

Furthermore, in a preferred embodiment of a method of producing an amino acid containing glycosylation composition derived from rice according to the present invention, it is characterized in that the enzyme is a diastatic enzyme or a proteolytic enzyme. In the present invention, although the use of enzyme is not essential factor, but it has the following advantages in the case of the use of the enzyme. That is, according to the present invention, the use of a various sort of the enzyme selectively makes it possible to carry out the continuous production of products such as maltotriose, isomalt oligosaccharide.

Furthermore, in a preferred embodiment of a method of producing an amino acid containing glycosylation composition derived from rice according to the present invention, it is characterized in that the diastatic enzyme is at least one selected from β-amylase, glucoamylase, or a transglucosidase. For example, the only use of β-amylase used as an enzyme in the present invention makes it possible to produce a mixture consisting primarily of maltose, and further the only use of glucoamylase makes it possible to produce a mixture consisting primarily of glucose.

Furthermore, in a preferred embodiment of a method of producing an amino acid containing glycosylation composition derived from rice according to the present invention, it is characterized in that the proteolytic enzyme is a protease.

Furthermore, in a preferred embodiment of a method of producing an amino acid containing glycosylation composition derived from rice according to the present invention, it is characterized in that the extruder is a tandem type of extruder. That is, in the present invention, it is possible to selectively use a tandem type of multiple extruder and an enzyme to be used. As a tandem type of multiple extruder capable of being used in the present invention, a cylinder constitution comprising from two stages to five stages is preferable, from a viewpoint of a uniformity of kneading and a degree of freedom, the number of screw existing in each stages is preferably 1 to 8. Although a tandem type of extruder having two stages or more of cylinder constitution is preferable, from a viewpoint of mass productivity, a simpleness of maintenance, two stages to three stages of cylinder constitution is particularly preferable.

Furthermore, in a preferred embodiment of a method of producing an amino acid containing glycosylation composition derived from rice according to the present invention, it is characterized in that from a viewpoint of mass productivity, a simpleness of maintenance, the tandem type of extruder is a three-stage comprising an upper cylinder, a middle cylinder and a lower cylinder, and from a viewpoint that both deactivation of enzyme and burning of the molded object within a die part should be avoided, a temperature of the cylinder drops down according to from the upper cylinder to the lower cylinder. Furthermore, a screw constitution within each cylinder is preferably a single or a double screw, from a viewpoint of mass productivity, a simpleness of maintenance, a double screw is particularly preferable. It is preferable that the tandem type of extruder has a mechanism capable of feeding an enzyme liquid or an enzyme to a junction of each stages in order to carry out an addition of the enzyme properly.

In the present invention, in the case of the manufacture of a mixture consisting primarily of maltose, from a viewpoint that α-1,4 bond can be effectively broken by using three-stage tandem type of extruder, a temperature of an upper cylinder is from 100 to 150° C., from a viewpoint of cooling of the product, a temperature of a middle cylinder is from 80 to 100° C., from a viewpoint of avoiding the inactivation of the enzyme, a temperature of a lower cylinder is from 40 to 60° C., it is preferable to use a middle vacuum chamber, and from there to drop 0.5 to 1.0% of a 1 to 5% β-amylase solution for a solid form.

Furthermore, in the case of the manufacture of a mixture consisting primarily of glucose, from a viewpoint that α-1,4 bond can be effectively broken by using three-stage tandem type of extruder, a temperature of an upper cylinder is from 100 to 150° C., from a viewpoint of cooling of the product, a temperature of a middle cylinder is from 80 to 100° C., from a viewpoint of avoiding an inactivation of the enzyme, a temperature of a lower cylinder is from 40 to 60° C., it is preferable to use a middle vacuum chamber, and from there to drop 0.5 to 1.0% of a 1 to 5% glucoamylase solution for a solid form.

Furthermore, an amino acid containing glycosylation composition derived from rice according to the present invention is characterized in that it is obtained by the method of producing an amino acid containing glycosylation composition derived from rice according to the present invention. It is possible to refer to the above explanation regarding a method of producing an amino acid containing glycosylation composition derived from rice according to the present invention.

Furthermore, in a preferred embodiment of an amino acid containing glycosylation composition derived from rice comprising a sugar made by a monosaccharide, a disaccharide, a trisaccharide and a tetrasaccharide or more, and an amino acid, it is characterized in that a total amount of a monosaccharide or a disaccharide of the amino acid containing glycosylation composition is more than a total amount of a trisaccharide or tetrasaccharide or more.

EXAMPLE

At this moment, the present invention will be concretely explained in more detail with reference to Examples below, but the invention is not intended to be interpreted as being limited to Examples. Moreover, it is possible to change appropriately without departing from the scope of the invention.

Example 1

At first, in the manufacture of a mixture of a starch sugar and an amino acid, an examination was carried out by using glutinous rice as a raw material. In the manufacture of an amino acid containing glycosylation composition derived from rice, a tandem type of a multiple-stage of extruder was used.

At first, the manufacture of an amino acid containing glycosylation composition consisting primarily of glucose was examined. In the case of the manufacture of a mixture consisting primarily of glucose, three-stage tandem type of extruder is used to set at from 100 to 150° C. of a temperature of an upper cylinder, and to set at from 80 to 100° C. of a temperature of a middle cylinder, and to set at from 40 to 60° C. of a temperature of a lower cylinder. A middle vacuum chamber was used and from there to drop 0.5 to 1.0% of a 1 to 5% glucoamylase solution for a solid form. The termination of these steps in less than an hour makes it possible to obtain an objective amino acid containing glycosylation composition for a short time.

A sugar component data of the obtained composition is shown in Table 1.

TABLE 1

| | Monosaccharide (Glucose) | Disaccharide (maltose) | Tri-saccharide | Tetrasaccharide or more |
|---|---|---|---|---|
| Exa. 1 | 93.47 | 3.32 | 0.87 | 2.34 |
| rice syrup (ref.) | 7.00 | 57.00 | 13.00 | 23.00 |

FIG. 1 shows a liquid concentrated composition of an example embodiment of an amino acid containing glycosylation composition derived from rice according to the present invention. The composition contains an amino acid. FIG. 2 shows a liquid purified preparation of an example embodiment of an amino acid containing glycosylation composition derived from rice according to the present invention. The main component is glucose. FIG. 3 shows a powderized liquid concentrated composition (which is those shown in FIG. 1) of an example embodiment of an amino acid containing glycosylation composition derived from rice according to the present invention.

As a result of this, in the case of the use of glucoamylase, it is assumed that it has a high degree of sweetness comparing with those of a rice syrup in the prior art. Moreover, it is recognized that the amount of a monosaccharide and a disaccharide is very high comparing with that of a trisaccharide or more.

Example 2

Next, the manufacture of an amino acid containing glycosylation composition consisting primarily of maltose was examined. In the manufacture of a mixture of a starch sugar and an amino acid, an examination was carried out by using glutinous rice as a raw material. In the manufacture of an amino acid containing glycosylation composition derived from rice, a tandem type of a multiple-stage of extruder was used. In the case of the manufacture of a mixture consisting primarily of maltose, three-stage tandem type of extruder is used to set at from 100 to 150° C. of a temperature of an upper cylinder, and to set at from 80 to 100° C. of a temperature of a middle cylinder, and to set at from 40 to 60° C. of a temperature of a lower cylinder. A middle vacuum chamber was used and from there to drop 0.5 to 1.0% of a 1 to 5% β-amylase solution for a solid form. The termination of these steps in less than an hour makes it possible to obtain an objective amino acid containing glycosylation composition for a short time. A sugar component data of the obtained composition is shown in Table 2.

TABLE 2

|  | Monosaccharide (Glucose) | Disaccharide (maltose) | Tri-saccharide | Tetrasaccharide or more |
|---|---|---|---|---|
| Exa. 2 | 14.00 | 80.00 | 3.00 | 3.00 |
| rice syrup (ref.) | 7.00 | 57.00 | 13.00 | 23.00 |

As a result of this, it was recognized that an amino acid containing glycosylation composition manufactured by using β-amylase has a high ratio of maltose comparing with comparing with those of a rice syrup in the prior art. Moreover, it is recognized that the amount of a monosaccharide and a disaccharide is very high comparing with that of a trisaccharide or more.

Examples 3 to 5

Next, according to the same procedure as the above Examples, in the case that a glucose treatment or a maltose treatment were carried out by using a glutinous rice, a nonglutinous rice, the contained amino acid of an amino acid containing glycosylation composition according to an embodiment of the present invention was analyzed. The result of this is shown in Table 3. In Table 3, Example 3 is data of a rice glycosylation liquid (The use of nonglutinous rice. Treated by Glucose.), Example 4 is data of a rice glycosylation liquid (The use of glutinous rice. Treated by Glucose.), Example 5 is data of a rice glycosylation liquid (The use of glutinous rice. Treated by Maltose.)

cally break the α-1,4 bond in the starch to selectively add β-amylase, glucoamylase during the process to continuously produce glucose and maltose. Further, it was recognized that although in the similar method of producing the glycosylation composition of the prior art, a long-term process, for example, about from 24 hours to 48 hours and a number of batch steps are required, but the present inventions make it possible to obtain a desired amino acid containing glycosylation composition in the brief period of one hour or less in very simplified process.

INDUSTRIAL APPLICABILITY

Recently, since an effective utilization of rice powder or rice grains become serious problems and the rice powder or rice grains can be substituted for a principal food component such as bread etc., the present techniques can be applied for a wide variety of fields.

The invention claimed is:

1. A method of producing an amino acid containing glycosylation composition derived from rice, which comprises:
    a step of compressing and kneading rice powder or rice grains within a cylinder by using an extruder to break an α-1,4 bond in starch, and
    a step of breaking the α-1,4 bond in starch and/or an α-1,6 bond in starch by adding an enzyme into the cylinder, wherein the extruder is a tandem type of extruder, and the tandem type of extruder is a three-stage comprising an upper cylinder, a middle cylinder and a lower cylinder, and a temperature of the upper cylinder is from 100 to

TABLE 3

|  | Exa. 3 | | Exa. 4 | | Exa. 5 | | Ref. (rice syrup) | |
|---|---|---|---|---|---|---|---|---|
| test item | Result (mg/100 g) | ratio | Result (mg/100 g) | ratio | Result (mg/100 g) | ratio | Result (mg/100 g) | ratio |
| Arginine | 232 | 8.5% | 300 | 8.2% | 279 | 8.2% | 26 | 5.5% |
| Lysine | 92 | 3.4% | 119 | 3.2% | 120 | 3.5% | 20 | 4.2% |
| Histidine | 73 | 2.7% | 99 | 2.7% | 89 | 2.6% | 9 | 1.9% |
| Phenylalanine | 147 | 5.4% | 203 | 5.5% | 189 | 5.5% | 16 | 3.4% |
| Tylosin | 117 | 4.3% | 151 | 4.1% | 141 | 4.1% | 6 | 1.3% |
| Leucine | 228 | 8.4% | 313 | 8.5% | 293 | 8.5% | 32 | 6.7% |
| Isoleucine | 111 | 4.1% | 154 | 4.2% | 143 | 4.2% | 13 | 2.7% |
| Methionine | 69 | 2.5% | 90 | 2.5% | 84 | 2.5% | 7 | 1.5% |
| Valine | 162 | 5.9% | 221 | 6.0% | 205 | 6.0% | 22 | 4.6% |
| Alanine | 154 | 5.6% | 210 | 5.7% | 196 | 5.7% | 32 | 6.7% |
| Glycine | 130 | 4.8% | 168 | 4.6% | 154 | 4.5% | 27 | 5.7% |
| Proline | 131 | 4.8% | 176 | 4.8% | 162 | 4.7% | 24 | 5.1% |
| Glutamic acid | 474 | 17.4% | 656 | 17.9% | 618 | 18.1% | 123 | 25.9% |
| Serine | 143 | 5.2% | 191 | 5.2% | 175 | 5.1% | 28 | 5.9% |
| Threonine | 101 | 3.7% | 137 | 3.7% | 125 | 3.7% | 16 | 3.4% |
| Aspartic acid | 259 | 9.5% | 341 | 9.3% | 313 | 9.2% | 55 | 11.6% |
| Tryptophan | 37 | 1.4% | 49 | 1.3% | 45 | 1.3% | 7 | 1.5% |
| Cystine | 66 | 2.4% | 85 | 2.3% | 80 | 2.3% | 12 | 2.5% |
|  | 2.726 | 100% | 3.663 | 100% | 3.411 | 100% | 475 | 100% |

As a result, in the all item, it was recognized that these compositions contain about 6 to 8 times of an amino acid comparing with that of the prior art. Further, it was recognized that it is possible to powderize these compositions according to the common procedure, and further to condense (powderize) it by about 2 times.

As the above mentioned result, it was recognized that it is possible to produce glucose etc., without the use of α-amylase which is required for the manufacture in the prior art. Further, the use of the extruder makes it possible to mechani- 150° C., a temperature of the middle cylinder is from 80 to 100° C., a temperature of the lower cylinder is from 40 to 60° C.

2. A method of producing an amino acid containing glycosylation composition derived from rice according to claim 1, which further comprises:

a step of adding water to the rice powder or rice grains as a preparation.

3. A method of producing an amino acid containing glycosylation composition derived from rice according to claim 1, wherein the enzyme is a diastatic enzyme or a proteolytic enzyme.

4. A method of producing an amino acid containing glycosylation composition derived from rice according to claim 3, wherein the diastatic enzyme is at least one of β-amylase, glucoamylase, or a transglucosidase.

5. A method of producing an amino acid containing glycosylation composition derived from rice according to claim 3, wherein the proteolytic enzyme is a protease.

* * * * *